US008311979B2

(12) United States Patent
Auvenshine et al.

(10) Patent No.: US 8,311,979 B2
(45) Date of Patent: *Nov. 13, 2012

(54) METHOD AND SYSTEM FOR IMPORTING AN APPLICATION AND SERVER MAP TO A BUSINESS SYSTEMS MANAGER DISPLAY

(75) Inventors: John Jason Auvenshine, Tucson, AZ (US); Justin C. Blackburn, Surprise, AZ (US); Christopher Joel Jacoby, Chandler, AZ (US); Edward Fosdick Nicolas, Frederick, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/051,435

(22) Filed: Mar. 18, 2011

(65) Prior Publication Data

US 2012/0011248 A1 Jan. 12, 2012

(51) Int. Cl.
*G06F 17/30* (2006.01)
(52) U.S. Cl. ........................................ 707/609; 707/634
(58) Field of Classification Search .................. 707/609, 707/634
See application file for complete search history.

(56) References Cited

U.S. PATENT DOCUMENTS

| | | | |
|---|---|---|---|
| 5,500,934 A | 3/1996 | Austin et al. | |
| 6,425,007 B1 | 7/2002 | Messinger | |
| 7,239,629 B1 | 7/2007 | Olshansky et al. | |
| 7,475,003 B1 | 1/2009 | Madhusudhana | |
| 8,070,605 B2 * | 12/2011 | Tien et al. | 463/42 |
| 2001/0032263 A1 * | 10/2001 | Gopal et al. | 709/227 |
| 2003/0084349 A1 * | 5/2003 | Friedrichs et al. | 713/201 |
| 2003/0149919 A1 | 8/2003 | Greenwald et al. | |
| 2004/0143599 A1 * | 7/2004 | Shalabi et al. | 707/104.1 |
| 2005/0182779 A1 | 8/2005 | Perry et al. | |
| 2007/0060365 A1 * | 3/2007 | Tien et al. | 463/42 |

* cited by examiner

*Primary Examiner* — Jean M Corrielus
(74) *Attorney, Agent, or Firm* — Jeff LaBaw; Darcell Walker

(57) ABSTRACT

An automated system displays enables a user to observe the activities in a system based on information in the display. From this display, the user can quickly identify the source of problems for the purpose of troubleshooting without the need to manually determine the source and nature of the problem. In this system, data about the system is gathered through a plurality of agents positioned throughout the network. This data is analyzed and a system monitor deployment configuration is developed. This monitor deployment information along with information about the various devices in the system and any relationships of devices in the system are imported to the display system. The display system then displays this information showing the present relationships of the devices in the system.

6 Claims, 4 Drawing Sheets

METHOD AND SYSTEM FOR IMPORTING AN APPLICATION AND SERVER MAP TO A BUSINESS SYSTEMS MANAGER DISPLAY

FIELD OF THE INVENTION

The invention relates generally displaying computer system applications on a business manager display and more particularly to a method and system for automatically creating an application and server map and importing that created application and server to a business systems manager display. This displayed application and server map will assist a help desk person that is attempting to solve a customer's problem with a computer application.

BACKGROUND OF THE INVENTION

A "help desk" is well known today, and typically comprises a skilled person with a telephone to receive calls from customers regarding computer related problems, and a (computer) workstation to assist in resolving the problems. The workstation typically includes a web browser or other portal program to access the applications for which the customers often have problems. Both the help desk workstation and the customer may access the applications from remote servers. The help desk workstation is also typically equipped with a program tool to access a problem ticketing system. The help desk personnel may be structured hierarchically, with the lowest skilled ("first level") support people sitting at the help desk workstation to interface directly with the customers, and higher skilled ("second level") support people available elsewhere to interface to the first level support people and answer difficult questions that the first level support people cannot. Typically, customers are allowed to call (telephone) a help desk when they are having a problem with an application running on their own computer or on the remote server. The first level support person at the help desk then attempts to troubleshoot the problem based on personal experience/knowledge and application support documentation, with or without assistance from the second level support people. Sometimes, even the second level support people cannot solve the problem. In such a case, the first or second level support person can call a technical expert for the application or system in question. This technical expert is typically a computer scientist or programmer responsible for developing and/or maintaining the application or system.

Large scale server operations, such as a large web hosting system or large data processing system, typically require extensive help desk and technical support. Ideally, the first level support person can quickly solve the customer's problem without involving either the second level support person or the technical expert. In such a case, the help desk will incur the cost of only one person. Also, the first level support person is generally lower paid than the second level support person. While the involvement of the second level support person adds to the cost, this is still preferable to involving the technical expert. Generally, the technical expert is much higher paid than even the second level support person and has other duties. So, it is preferable to minimize the role of the technical expert in help desk support. Also, solving problems without involving second level support people or technical experts expedites resolution of the problem.

The application support documentation is key to effective help desk support. The (known) application support documentation typically comprises names of servers that run the application, data flows and protocols, technical contacts, URLs, file system directories used by the application, and test login procedure. During server and application development and deployment, the development and deployment personnel often neglect to document critical aspects of the architecture and implementation for the application support documentation. Also, developers and steady state support personnel often modify the application and servers over time to include new backend databases, new connectivity and new uses, and fail to update the application support documentation. This causes additional deficiencies and inaccuracies in the application support documentation. Consequently, many applications and servers lack documentation to guide the help desk people to perform test procedures required to troubleshoot and correct the customers' problems. Such deficiencies and inaccuracies in application support documentation may prolong outages and cause excessive numbers of calls from the first level support person to the second level support people and technical experts. Also, the lack of application support documentation compounds the effort and cost required to solve a customer's problem.

Configuration information needed by the help desk personnel is often stored within a server. However, the help desk personnel may be prevented from accessing or understanding configuration information in a server. For example, access to configuration files within the server may be limited to people with "super user", "root" or "administrator" privilege level. This is because the configuration affects overall operation of the applications, and may include user IDs and passwords. The help desk people typically lack such a high privilege level. Even when a help desk person has permission to (remotely) access configuration information within a server, the help desk person may not understand the format of the information because it may be designed for an application to read. Also, the helpdesk person may cause additional damage if the help desk person is not properly trained or follows an improper procedure.

Oftentimes, an application (such as a web site application) will be "down" because a single backend database used by the application does not respond. The backend database itself may be down or the communication link between the application and the backend database may be down. Because help desk people (first and second level) may not be familiar with the server architecture, including the backend databases, they may erroneously think the application or the server on which the application is running is malfunctioning whereas the problem is actually with the backend database or its connection to the application. In such a case, the help desk people will not be able to correct the problem, and may even call a developer of the application or the server on which it is running for technical support. Typically, the developer of the application or server on which it is running will not know the identity or state of the backend databases, and cannot solve the problem. In such a case, the time and effort of first and second level support people and one or more technical experts will be wasted. Without identifying the backend database as the problem, the support people may not even know the proper systems administrator to call to trouble shoot the problem.

The hardware, software or network components used in supporting an application may themselves incorporate the capability of providing status and diagnostic information in response to an inquiry or test. The simplest such inquiry is the common TCP/IP network "ping", "traceroute" or "netstat" inquiry, however existing hardware, software, and network components also provide more detailed status and diagnostic information than is available via "ping", "traceroute" and "netstat". For example, a DCE/DFS file system includes the ability to query the ability of file servers to serve files, all the way through the software stack. The ability to initiate such tests or queries for status data is a significant aid in determining the source of a problem. A skilled operator entering a command or set of commands on the server being queried typically initiates inquiries for this data or a remote server connected via a network. Multiple steps, including login/authentication, setting environment or software debug parameters, command initiation, and output parsing, may be required in order to obtain the results of a status inquiry. The operator then interprets the results and determines whether the queried component is functioning within normal parameters. A help desk operator may be unaware of the availability of this diagnostic data, unable to properly initiate the queries required to access it, or unable to properly interpret the results of such a query. In such a case, the help desk operator may not be able to determine if, or where, a problem exists and will need to call in technical experts to properly initiate status queries and interpret the results of such queries.

US Patent Publication US 2003/0149919 A1 discloses systems and methods for diagnosing faults in computer networks. A topology mapper provides a network topology including the location of key services (such as e-mail, DNS, web server). The system uses the network topology to dynamically generate a thorough traceroute using a path-tracing algorithm. A fault diagnosis engine diagnoses a fault related to the communications network. The network management system also includes a help desk.

U.S. Pat. No. 6,353,446 discloses a program to assist a service person in managing an enterprise network. Network visibility software provides access to information from both local and remote client/server networks, providing a central control point from which to manage traffic on distributed networks. Network visibility software assists in explaining possible causes for network problems, collects expert analysis data automatically based on user-specified time intervals and data parameters, learns network configurations continuously, shows breakdown of network protocol activity automatically, and displays network errors. Nevertheless, further improvements are desired to assist help desk people troubleshoot and correct problems with applications and servers.

Other systems for mapping network topology were known that proactively map how networks are connected and where IP addresses reside within networks. These systems test for network connectivity of servers and other computer devices, and generate lists of what server or other computer device is connected to what network at the TCP/IP layer of the network stack. For example, the mapping will indicate on which subnet each server or other computer device resides. Other systems gather network statistics from a network interface to determine if there are any TCP/IP connections.

With the current systems, much of the information is gained from monitoring systems that track network activities and issue alerts when an event triggers a particular situation or condition. The system operator or user (help desk person) is made aware of the alert. However, the current systems do not automated and do not provide details about the nature of the alert or system location where the event occurred that triggered the alert.

There remains a need for a method and system that will generate and display information about system activities for the purpose of troubleshooting system problems. The method and system should be able to provide information about the system location of a problem and the computing equipment related to the problem.

SUMMARY OF THE INVENTION

It is an object of the present invention is to automatically guide a help desk person in troubleshooting and correcting a customer problem in utilizing an application, which is executing in a computing system environment.

It is a second object of the present invention to monitor and display activity within the computing system environment in which an application is executing.

It is a third object of the present invention to generate a configuration of servers deployed in the computing system environment in which an application is executing.

It is a fourth objective of the present invention to generate information related to the servers deployed in the computing system environment and to store such generated information in a database.

It is a fifth objective of the present invention to generate a custom deployment configuration for monitors in the computing system environment such that the monitors will accurately capture activities at the deployed server locations.

It is a sixth objective of the present invention to transport information about the deployed monitors to a display system for displaying such information to users.

The invention resides in a system, method and program for troubleshooting a problem with an application. The system of the present invention comprise a server configuration for a computing system, a relational database for storing data containing relationship information between servers, a server management program and a server configurations display. Users can view the server display to monitor computing system activities and identify and locate problems during troubleshooting activities. The server manager program gathers information about servers deployed in the computing system, determines server monitor deployed positions and transmit server and server monitor information to the display.

In the method of the present invention, the server manager program gathers data about the servers in the computing system. This data gathering process comprises automatically sending hardware, software and or network status queries to the various server devices in the system. The server manager gathers the information received in response to the various submitted inquires. A monitor deployment module of the server manager program analyzes the data gathered by the data-gathering module. This data contains information about the relationships between servers in the system and the functions that each server performs view of these server relationships. As a result of the analysis of the information, the monitor deployment module generates a deployment configuration for monitors in this system. This configuration contains the positions (locations) of server monitors in the system. These monitors track activities of the servers and transmit server status information for display. The server manager program also contains an information importation module that converts the monitor deployment configuration information for transmission to and display at the display location.

DETAILED DESCRIPTION OF THE INVENTION

The present invention relates to a method and system for quickly and easily identifying problems in the execution of programs in a computing environment. This process involves four basic activities which include: (1) Characterizing the servers in the computing system and determining any relationships between theses servers, (2) Creating a custom monitoring system for these servers for deployment in the computing environment (3) transmitting the information describing the relationships between the servers and the information about the deployment configuration for the monitors to a display location and (4) displaying a hierarchical view of applications to users by importing the server relationship information and deployment configuration information into the display system.

The first activity (characterizing the servers in the computing system and determining any relationships between theses servers) was described in a previously filed United States patent application 20050278571 to these same inventors, the contents of which are herein incorporated by reference.

Figure 1:
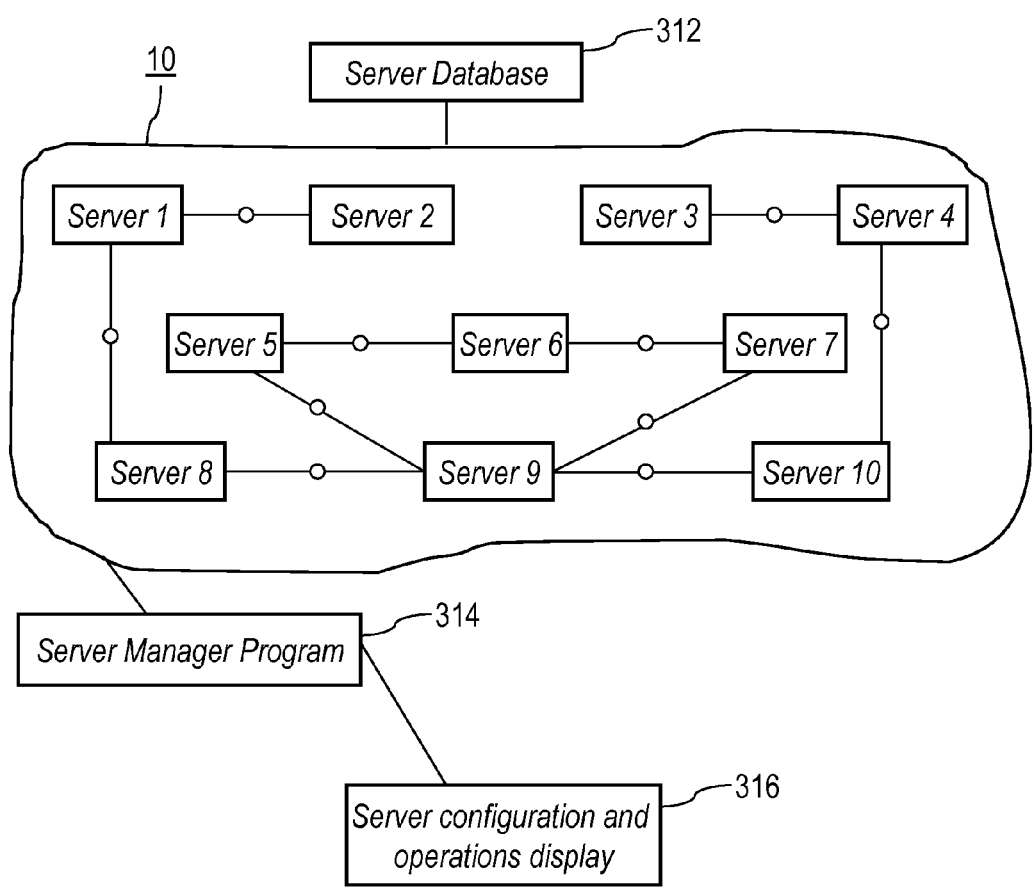
FIG. 1 is a block diagram of a server based computing system according the present invention.

FIG. 1 is a block diagram of a server based computing system according the present invention. A server system configuration 310 comprises a plurality of connected servers. A server database 312 connects to the computing system and contains information about the servers and the relationships between servers in this system. A server manager program 314 connects to the computing system, monitors the activities on the system and conveys such information to a server configuration and operations display 316.

Figures 2, 3:
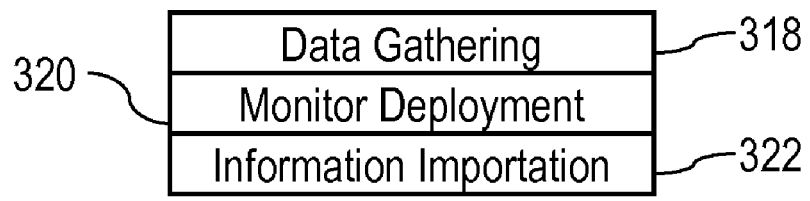
FIG. 2 is a block diagram of the modules that comprise the server manager program of the present invention.
FIG. 3 is a diagram of server information stored in a relationship database in accordance with the present invention.

FIG. 2 illustrates the software modules that comprise the server manager program of the present invention. The program has three basic module components. The first module 318 is the data-gathering module. As mentioned, this module queries devices on the computing system and retrieves information about the different system devices. The queries also produce information about the relationships between the system devices. The characteristic and relational information about a device is stored in the database 330. Some of this information is relational information. FIG. 3 shows the relational information for the servers in FIG. 1. These database entries represent the different connections or relations between system servers. Although not shown in FIG. 3, the specific connections of the servers can also produce additional capabilities that would be captured as part of the relation between server devices. Referring again to FIG. 2, the second module 320 retrieves the information gathered by module 318. Module 320 then analyzes the information in order to generate a custom monitor configuration to monitor the server activities. The importation module 322 then converts the monitor deployment information and information about the inter-relationships between devices on the computing system to a acceptable for importation to the computer system display.

In a computing system, there are management functions that control the operations on the system. Part of the management function is a system that monitors computing activities and sends alerts when certain events occur or certain conditions exist. As mentioned, the current systems send these alerts through to the display, but with very little or no details about the nature of the events that triggered the alert. For example, if the information from the data-gathering module is that a certain server is a database server, the monitor deployment module analysis would conclude that the monitor for that server should be database monitor. A database monitoring function tracks activities and information related to activities of a database server. A current problem is that a monitor assigned to monitor the database server may not be a database server monitor. The monitor may be not programmed to monitor activities related to the operations of a database server. Therefore, the current monitoring configuration may not match the proper monitor with the appropriate server device. The present invention corrects that problem. This analysis in the monitor deployment is performed for each server device in the system. The particular server configuration will dictate the number of monitors that may be deployed for a particular system.

Figure 4:
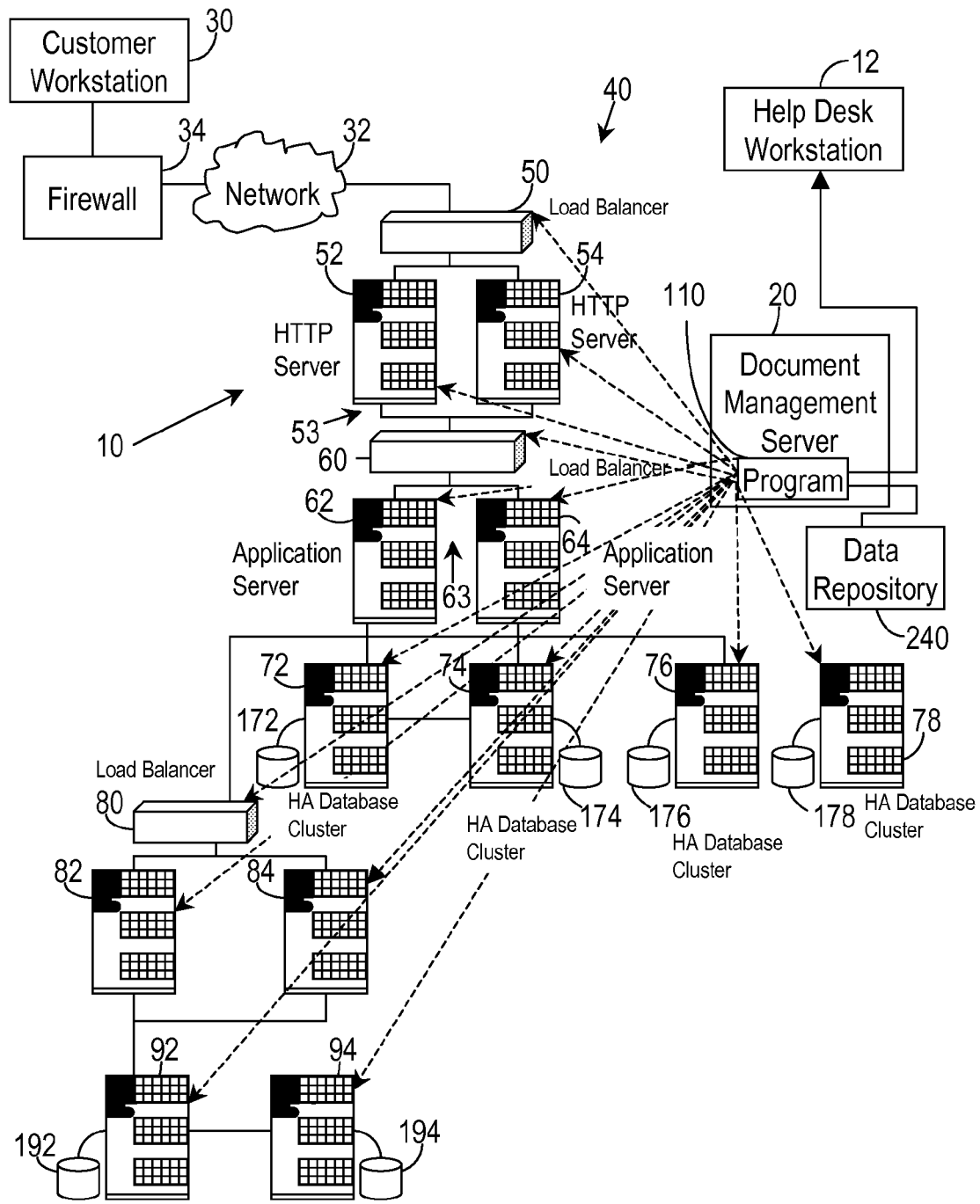
FIG. 4 is a block diagram of a distributed computer system, a help desk workstation and a documentation management server according to the present invention.

The present invention will now be described in detail with reference to the figures. FIG. 4 illustrates a distributed computer system generally designated 10, a help desk workstation 12 and a documentation management server 20 according to the present invention. Distributed computer system 10 comprises a customer workstation 30 coupled by a network 32 and an optional firewall 34 to a distributed server system 40. The network 32 can be an intranet, the Internet or an extranet, and can use a variety of network protocols such as TCP/IP or SNA. The distributed server system 40 can take various forms and have various architectures with varying numbers, arrangements and layers of servers, such as those illustrated in FIG. 4. In FIG. 4, requests from client workstation 30 for an application are forwarded via the network 32 to a load balancer 50 for a cluster 53 of servers. Load balancer 50 then selects server 52 or 54 within the cluster 53 to handle the request, based on their availability or other known load balancing criteria. By way of example, servers 52 and 54 are web servers, i.e. handle requests via the Internet for applications represented by web pages. However, in another embodiment of the distributed server system 40, the client requests are forwarded directly to a single web (or other type of) server such as server 52 (and there is no load balancer 50 or server 54). In the embodiment illustrated in FIG. 4, the application requested by the client workstation 30 does not reside on server 52 (or 54). So server 52 determines, based on an internal configuration file, the IP address of another server or server cluster that contains the requested application. Server 52 also includes a program used to communicate with this other server or cluster. In the embodiment illustrated in FIG. 4, server 52 forwards the customer request to a load balancer 60 for a cluster 63 of application servers. Load balancer 60 then selects one application server 62 or 64 in cluster 63, such as server 62, to handle the request, based on their availability or other known load balancing criteria. However, in another embodiment of the distributed server system 40, the client requests are forwarded directly from server 52 to a single application server such as server 62 (and there is no load balancer 60 or server 64).

In the embodiment illustrated in FIG. 4, each of the application servers 62 and 64 comprises a middleware program in addition to the actual application requested by the client workstation 30. The middleware program is responsible for managing differences in format and protocol, if any, between the client request and the requested application. The application on server 62 is responsible for obtaining the data pertaining to the customer request and performing any computations pertaining to the customer request. In the illustrated embodiment, the application on server 62 can obtain the data from backend database servers 72, 74 or 76. Each backend database server 72, 74 and 76 obtains the requested data from one or more data repositories, such as respective disk storages 172, 174 and 176. In high availability environments, there will ordinarily be a backup (backend) database server in case the primary (backend) database server fails. In the illustrated embodiment, backend database servers 72 and 74 can perform this backup role for each other, and a backend database server 78 backs-up database server 76. In some cases, the application on server 62 generates a web page or other screen to send to the client workstation based on the data, which it obtains. The web page or other screen permits the customer to interactively use the application. In other cases, the middleware program on server 62 or 64 generates the web page or other screen for display on client workstation 30, based on data supplied by the application. In both cases, the application generally needs to obtain data from one of the database servers 72, 74 or 76. In the case of a web server, the data may be a web page itself.

In many cases such as illustrated in FIG. 4, a single application executing on server 62 (or 64) is able to handle the customer request by directly querying backend database servers 72, 74 or 76, for the requisite data (and then processing the data if needed). However, in other cases also illustrated in FIG. 4, the single application on server 62 cannot alone handle the customer request, even with data from backend database server 72, 74 or 76. For example, if the customer request requires two different services such as one to list homes for sale and another to process a mortgage request, two different applications may be required, one to display the list of the homes for sale and manage the interface to the customer, and the other application to process the mortgage request. In such a case, the application in server 62 may supply one of the services (and obtain the data for that service from backend database server 72, 74 or 76), but may need to query another server or server cluster for the other application to process the mortgage request (and obtain the data for that service from another backend database. In the illustrated embodiment, this other cluster 83 of servers comprises a load balancer 80 and application servers 82 and 84. Each of the application servers 82 and 84 comprises the second (for example, mortgage) application as noted above which accesses database server 92 or 94 for the requisite data. Each of the application servers 82 and 84 also comprises middleware if necessary to interface to the format and protocol of the client request and format a web page or other screen for display at the client workstation. Each backend database server 92 and 94 accesses one or more data repositories, such as respective disk storages 192 and 194. In high availability environments, there will ordinarily be a backup (backend) database server in case the primary (backend) database server fails. In the illustrated embodiment, backend database servers 92 and 94 can perform this backup role for each other. The foregoing features of server system 40 were known in the industry.

"Agent" programs run on the web servers, application/middleware servers and database servers 52, 54, 62, 64, 72, 74, 76, 78, 82, 84, 92 and 94, respectively within server system 40 to automatically gather configuration and other information about the respective servers and supply the information to server 20. If the load balancers 50, 60 and 80 are capable or running agent programs (for example, have operating systems capable or running agent programs), then respective agent programs run on the load balancers 50, 60 and 80 as well. In the illustrated embodiment, agent programs can run on load balancers 50, 60 and 80. However, in an alternate embodiment, one or more of the load balancers 50, 60 or 80 do not include agent programs. (Agent programs that can gather data in a server were known in the art, but have been customized according to the present invention to gather configuration and other information needed to implement the present invention.) A documentation generation program 110 runs on server 20, receives the configuration and other information supplied by agent programs and automatically generates application support documentation to assist the help desk people troubleshoot and correct customer problems with server system 40.

Figure 5:
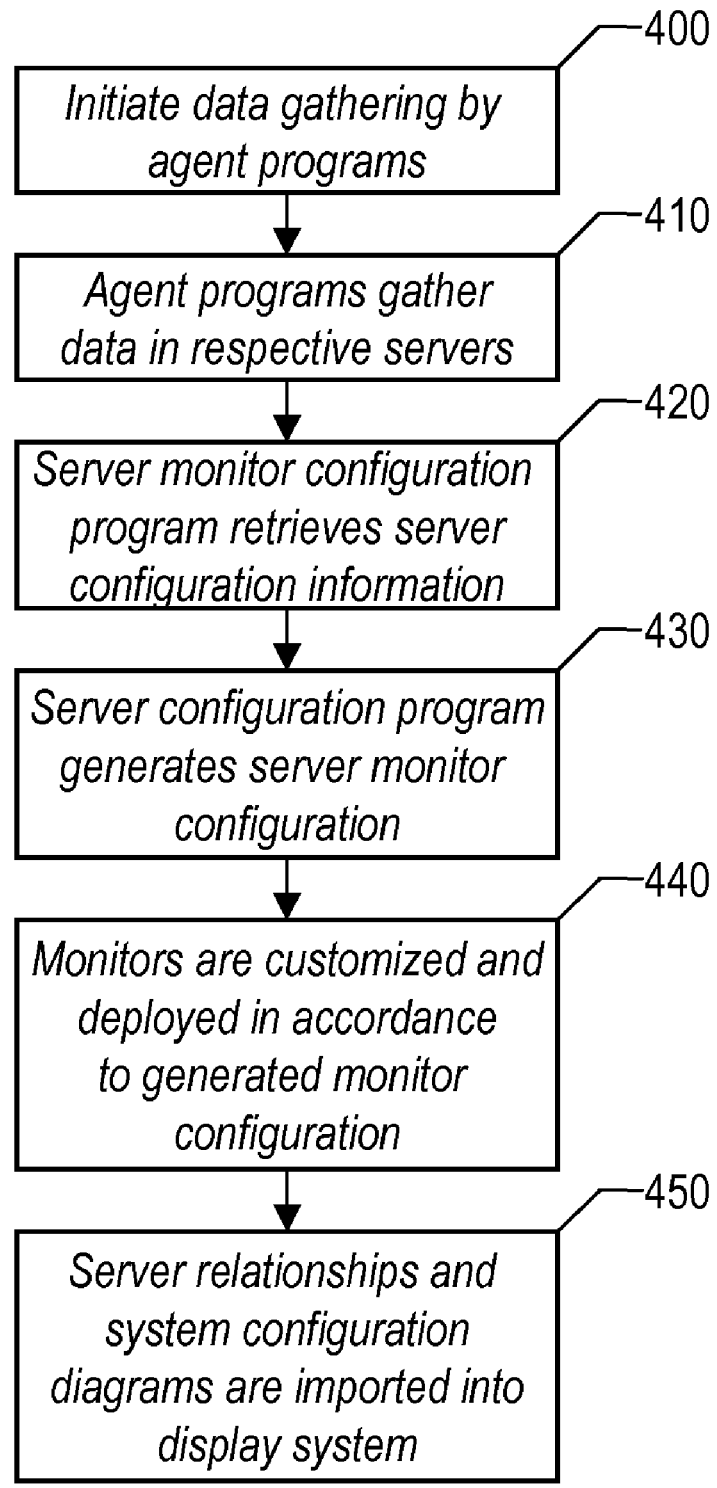
FIG. 5 is a flow diagram of the steps in the implementation of the method in accordance with the present invention.

FIG. 5 is a flow diagram of the steps in the implementation of the method in accordance with the present invention. The initial step 400 is to gather information about the various server devices in the system. This data gathering process involves querying the relational database to retrieve information about the functions of the server devices and the connections of the server devices to other system devices. The queries are designed to gather certain information about a device. For example, the first query could to determine the type of device. If the response were that the device is a database server, the next query could be related to functions of a database server. If the machine were a different server, the next query would be related to that type of server.

In step 400, the agent programs within server system 40 can initiate data gathering. In some cases, a query program can periodically send requests to agent programs to gather the configuration and other data from their respective servers. In other cases, the agent programs initiate their own data gathering activity, either based on their own predetermined schedule or based on occurrence of events or significant changes, such as changes to configuration in their respective servers.

In step 410, agent programs begin the actual data gathering in their respective servers. By way of example, agent programs can comprise script programs that can execute on their respective servers to solicit or read configuration and other information from the operating systems and configuration files within their respective servers. Then, agent programs report the information to program 110 in documentation management server 20. For example, agent programs may gather configuration information from Apache httpd.conf configuration file and IBM Websphere adminlconfig configuration file.

For each of the web servers 52 and 54, these configuration files contain various types of information such as a list of the URLs that lead to/reside on the web server, and for each of these URLs (i) when the requested application resides on another, application/middleware server, an identification of this other application/middleware server (by IP address and virtual host), or (ii) when the requested application resides on the web server, a reference to static data files that contain requested information for the application, or (iii) when the requested function can be performed by a scripting file (for example, "CGI" script files) on the web server, and a pointer to the scripting file.

For each of the application/middleware servers 62, 64, 82 and 84, these configuration files contain the following types of information: (a) a list of the URLs that lead to/reside on this web server, and for each of these URLs (i) when the requested application resides on another, application/middleware server, an identification of the application/middleware server (by IP address and virtual host), or (ii) when the requested application resides on the web server, a reference to static data files that contain requested information for the application, or (iii) when the requested function can be performed by a scripting file (for example, "CGI" or java script files) on the web server, a pointer to the scripting file and (b) for each virtual host in the application/middleware server, (i) an identity (by IP address and database instance or port) of the connection to the backend database server(s) accessed by the virtual host, (ii) identities of other application servers that run the same application, (iii) identities of other application servers that access the same database, if known.

Referring again to FIG. 5, after the completion of the data gathering function, step 420 receives the gathered data at the server monitor configuration module. This retrieval of the information can be from the database or it can be received directly from the data-gathering module. The most common approach would be for the gathered data to be stored in the database prior to transmission to the server monitor configuration module. As mentioned, the retrieved information would comprise information gathered relating to the function of a device and information about the relationships of this device to other devices in the system.

Step 430 generates a server monitor configuration for positioning monitors in strategic locations in the system. These positioned monitors would track the activities of the server devices and transmit messages or alerts when certain events or conditions occur. Step 430 analyzes the type of device and the relationships of the device and then identifies the proper monitor and monitor position to properly track the activities of that device.

Depending on the device, monitors are positioned at strategic places and are customized to track information related to the device in step 440. As mentioned, if a device were a database server, the monitor tracking that database server would be designed to track activities of a database server as opposed to activities generally related to another type of device. Other devices may have activities that are different from a database server. If a monitor tracking a database server is configured to track or detect activities related to another device and not the database server tracking errors would surely occur.

After the deployment of the monitor devices, step 450 imports the relationship information and diagramming information of the system into the display system. This information includes the server relationships and system configuration information to the display system for display to the system users and operators. This data importation involves a conversion of the system configuration information to a format suitable for importation into the display system. In a preferred embodiment, the information is converted to an XML format for importation. In this importation step 450, the information is also compartmentalized and displayed such that the user knows all relationships between devices and functions of that device. Therefore, when an event is detected and reported, the user will first know the monitor that detected the problem. Because the user knows the device is which the reporting monitor is assigned, the user can narrow the problem to the area of that device. Next, because the user knows the relationships of that device to other devices, the user can also narrow the search for the problem. Further, if this problem was detected as the result of the existence of a previously defined situation, the user may be able to immediately identify the type of problem that triggered the monitor detection. With this information, the user can easily and quickly locate and solve system problems as they occur.

Based on the foregoing, a system, method and program for generating and displaying application support documentation and related troubleshooting documentation have been disclosed. However, numerous modifications and substitutions can be made without deviating from the scope of the present invention. Therefore, the present invention has been disclosed by way of illustration and not limitation, and reference should be made to the following claims to determine the scope of the present invention.

We claim:

1. A system for displaying an application and server map on a systems manager display comprising:
   a configuration of a plurality of data gathering points from a plurality of servers on a computing system, said data gathering points capable of gathering data of computing system activities, the gathered data including identification of devices on the computing system, functions of such devices and relationships between the identified devices on the computing system;
   a relational database for storing gathered data containing information about relationships between data points in the plurality of data points and for storing data about devices on the computing system and functions and relationships between devices;
   a computing system monitoring program that identifies locations on the computing system for placement of monitors for tracking activities of the devices identified on the computing system;
   a plurality of monitors deployed in accordance with the computing system monitoring program for importing information to a computing system operations display; and
   a computing system operations display for generating and displaying information imported from said plurality of monitors related to the relationships and activities between identified devices on the computing system.

2. The system configuration as described in claim 1 wherein a server management program monitors activities of the configuration of servers and conveys gathered information to said computing system operations display.

3. The system configuration as described in claim 2 wherein server management program
   said server management program further comprising a data-gathering module; a monitor deployment module; and an information importation module, wherein said server management program monitors activities of the configuration of servers and conveys gathered information to said server configurations display.

4. The system as described in claim 3 wherein said monitor deployment module retrieves information gathered by the data gathering module and generates a custom monitoring configuration to monitor server activities.

5. The system as described in claim 4 wherein said information importation module converts monitor deployment information and information about inter-relationships between devices into an acceptable importation format for display.

6. The system configuration as described in claim 1 wherein said a computing system monitoring program identifies locations on the computing system for placement of monitors for tracking activities of the devices identified on the computing system by identifying a device on the computing system, identifying relationships between the device and other devices on the computing system, customizing a monitor such that the monitor tracks specific activities of the device, and determining a deployment location such that the customized monitor tracks activities of the device.

* * * * *